(12) United States Patent
Dahlem

(10) Patent No.: US 6,315,085 B1
(45) Date of Patent: Nov. 13, 2001

(54) SEMI AUTOMATIC BRAKE APPLICATOR FOR WHEEL CHAIRS

(76) Inventor: James L. Dahlem, 2523 Valley View La., Dallas, TX (US) 75234

( * ) Notice: Subject to any disclaimer, the term of this patent is extended or adjusted under 35 U.S.C. 154(b) by 0 days.

(21) Appl. No.: 09/635,290

(22) Filed: Aug. 9, 2000

Related U.S. Application Data (63) Continuation-in-part of application No. 09/427,365, filed on Oct. 26, 1999, now abandoned.

(51) Int. Cl.[7] ........................................................ B60T 1/00
(52) U.S. Cl. ............................. 188/2 F; 188/31; 188/69; 280/304.1
(58) Field of Search ................................. 188/2 F, 106 R, 188/167, 110, 2 R, 12, 24.11, 24.15, 24.14, 74; 280/304.1, 250.1

(56) References Cited

U.S. PATENT DOCUMENTS

| | | |
|---|---|---|
| D. 412,869 | 8/1999 | Bissell . |
| 3,302,757 * | 2/1967 | Eagleson, Jr. et al. .............. 188/167 |
| 4,320,818 | 3/1982 | Knoche . |
| 4,350,227 | 9/1982 | Knoche . |
| 4,623,043 | 11/1986 | Babilas . |
| 4,852,697 * | 8/1989 | Kulik .................................... 188/2 F |
| 5,203,433 | 4/1993 | Dugas . |
| 5,358,266 | 10/1994 | Roth et al. . |
| 5,492,355 | 2/1996 | Berry . |
| 5,799,756 | 9/1998 | Roberts et al. . |
| 5,894,912 | 4/1999 | Dobben . |

* cited by examiner

*Primary Examiner*—Robert J. Oberleitner
*Assistant Examiner*—Melanie Torres

(57) ABSTRACT

A semi automatic brake applicator for wheel chairs which have at least one arm with an actuator lever pivotally attached to the arm, an actuator rod pivotally attached to the actuator lever at the first of two ends and to a clamp at the second end, the clamp being attached to the brake actuator lever of the wheel chair brake system. In operation, the actuator lever is rotationally pivoted which causes the actuator rod to move linearly which, in turn, causes the clamp to rotate the brake actuation handle thereby bringing the brake shoe into contact with the drive wheel thus setting the brake. Reverse motion of the actuator lever causes the brake to release.

13 Claims, 6 Drawing Sheets

SEMI AUTOMATIC BRAKE APPLICATOR FOR WHEEL CHAIRS

CROSS REFERENCE TO RELATED APPLICATIONS

This is a continuation-in-part of U.S. patent application Ser. No. 09/427,365 filed Oct. 26, 1999, now abandoned.

BACKGROUND OF THE INVENTION

It has long been recognized that an occupant of a wheel chair can be injured, potentially severely, if the chair is not braked against unwanted motion prior to the applicant attempting to rise out of the chair. This danger occurs because many wheel chair users lack the strength or agility to move from a sitting to a standing position or from a standing position to a sitting position without applying downward pressure on the arms of the wheel chair to assist themselves. Although wheel chairs are equipped with braking mechanisms, these mechanisms are purely manual in operation. That is, the brake must be set by an affirmative motion of either the wheel chair user or the user's helper.

If the brake is not set, at a certain point in the movement from a sitting to a standing position, or from a standing to a sitting position, accompanied by downward force on the arms of the wheel chair, the force applied to the arms of the chair by the user is actually angled toward the back of the wheel chair instead of down towards the surface on which the wheel chair rests. This backward force causes the wheel chair to roll back away from the user, often before the user has gained his balance, causing the user to fall to the ground, frequently injuring the hips, coccyx, or the like.

The purpose of this invention is to provide a means to apply the brake in a semi automatic fashion as soon as the occupant attempts to rise from the chair to prevent such catastrophes as described above.

SUMMARY OF THE INVENTION

There have been many attempts to provide automatic or semi-automatic brake applicators for wheel chairs for many of the reasons set forth herein. Most of the prior art devices involve the use of springs which must be matched to the size and weight of the user to function properly or levers which not only must be tuned to the size and weight of the user, but also expose the user and the user's helper to numerous pinch points which can trap hands and fingers causing serious injury or clothing or blankets thus inhibiting the intended mode of operation of such devices.

For example, in U.S. Pat. No. 5,203,433 to Dugas, the wheel chair brake is actuated when the user rises from the seat. The seat is equipped with a spring to bias it in an upper position in which the brake is applied. The force of the spring is overcome by the weight of the user sitting in the chair thereby causing the brake to be released. Use of this device requires that the springs in the seat not be so powerful that a person who is light in weight cannot overcome its force, yet, at the same time, be powerful enough to engage the brake when actuated.

U.S. Pat. No. 5,894,912 to Dobben also provides an automatic means to engage a braking device when the wheelchair is unoccupied. In the Dobben device, the brake is released when weight is placed upon sensing levers which run under the legs of the user, or alternatively, when brake actuation handles which are attached to the push handles of the wheel chair are squeezed. Again, in order for the device to function based upon the user's rising from the chair, the device must be tuned to the weight of the user. If clothing such is a blanket or quilt is trapped in the device, it may not release the brake upon occupancy of the chair by the user, or, alternatively, fail to set the brake as the user attempts to rise from the chair.

U.S. Pat. No. 4,350,227 to Knoche provides a spring loaded arm rest biased in a upper position connected to a rod which is in turn connected to a brake actuation lever. The upward biased arm rest is held in a lower position by the weight of the arm of the user. When the user's arm is lifted from the armrest, the spring loading moves the armrest to the upper position causing the rod to also move upward which in turn causes the brake to be engaged. Obviously, as will be seen, this design offers many drawbacks when compared to the present invention. The Knoche device, first of all, requires that springs of sufficient tension be selected to allow the weight of the arm of the user to depress the arm rest into the lower position while, at the same time, when the arm rest is unloaded, the spring must be strong enough to cause the brake to engage. Additionally, the arms of the user must remain on the armrest at all times, otherwise the brakes will be engaged by the upward motion of the rod in response to the armrest being raised to the upper position as a result of the lack of a depressing weight on the arm rest.

DETAILED DESCRIPTION OF THE INVENTION

Wheelchairs commonly in use have handle-actuated manually applied brakes, one for each large drive wheel, which, when the handle is rotated, causes a brake shoe to come into frictional contact with the large drive wheel. There are generally two types of handle actuated manually applied brakes in use: One type, such as that shown in FIG. 1, has the actuating handle in a substantially vertical position relative to the floor or ground upon which the wheelchair rests when the brake is released. The actuating handle is rotated to a substantially horizontal position relative to the floor or ground on which the wheelchair rests when the brake is applied.

Figure 2:
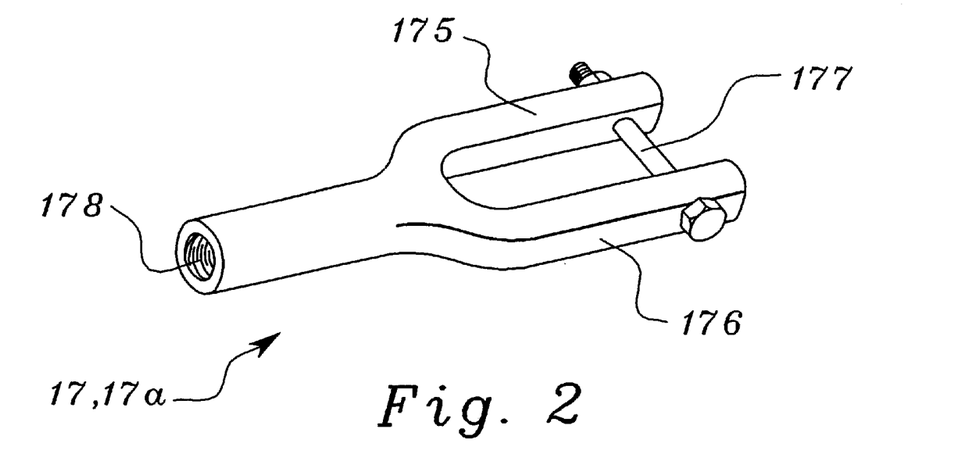
FIG. 2 is a plan view of the pivot clamp

The second type of handle actuated manually applied brakes in use is generally in a substantially horizontal position, as shown in FIG. 2, relative to the floor or ground upon which the wheelchair rests when the brake is not applied and rotatable to an essentially vertical position relative to the floor or ground upon which the wheelchair rests when the brake is actuated.

Figure 1:
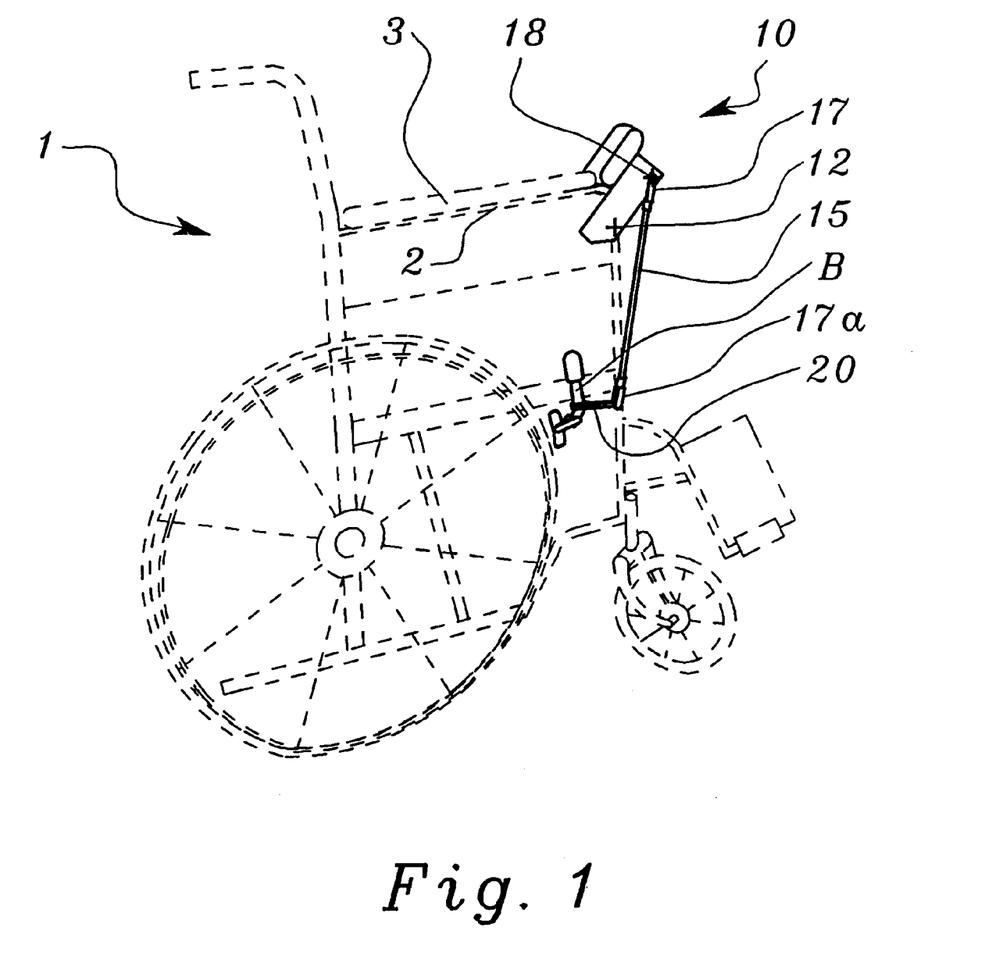
FIG. 1 is a plan view of one embodiment of the invention in the brake deactivated position.

FIG. 1 shows a wheelchair 1 in phantom of a type well known in the art, having at least one tubular metallic arm 2 with padded arm rest 3 positioned essentially parallel to the surface on which the wheel chair rests. An actuator lever 10 is pivotally attached to the tubular metallic arm 2 using a pipe clamp of a kind well known in the art, not shown. For purposes of clarity, only one side of the wheel chair and the invention is shown. In practice. however, it is contemplated the wheelchair will have two arms and that a mirror image of the invention as shown is in place on the other arm of the wheel chair.

The actuator lever 10 comprises, in side view, an essentially rectangular shape having a front edge and a rear edge, a top edge and a bottom edge. The pivotal attachment point 12 of the actuator lever 10 to the clamp on the tubular metal arm 2 is located near the intersection of the bottom edge and the rear edge of the actuator lever 10. The actuator lever is attached to the pipe clamp using a pivot pin of suitable size, or any other attachment means suitable to the task.

An actuator rod 15 having a first, threaded, upper end and a second, threaded, lower end has threaded onto each of said ends thereof a clamp 17, 17a as hereinafter described. Clamp 17, 17a has a forked end with spaced apart furcations 175, 176 and a pivot pin 177 mountable between the furcations, and includes threaded means 178 for receiving the actuator rod 15. Actuator rod 15 is threadedly attached at its upper end by means of upper clamp 17 to pivot point 18 on actuator lever 10 near the intersection of the forward and bottom edges by means of a pivot pin 177 located between the furcations. The pivot pin is secured to clamp 17, 17a by a threaded nut or other suitable means. The actuator rod 15 reciprocates in response to the pivotal motion of the actuator lever 10. The lower end of actuator rod 15 is threadedly inserted into lower clamp 17a.

Figure 3:
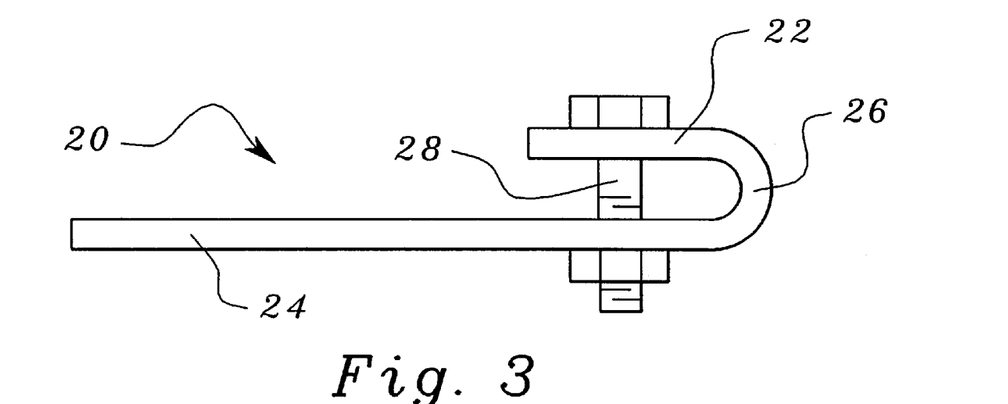
FIG. 3 is a plan view the operator clamp.
Figure 4:
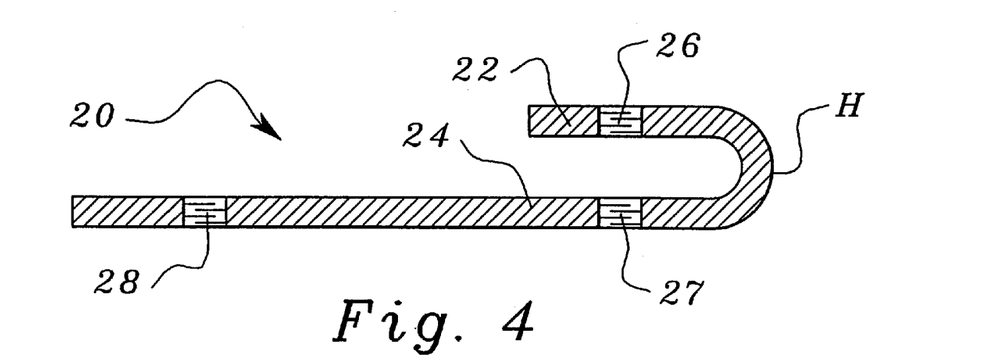
FIG. 4 is a sectional view of the operator clamp showing placement of pivot holes therethrough.

Operator means 20, shown in FIG. 3 has a body having a first end and a second end, said body being formed into a hook proximal to one end of the operator means. The hook has a first arm 22 and a second arm 24, said first and second arms being continuously formed from the same piece of material so that a bridge 26 exists between them. The first arm 22 is shorter in length than the second arm 24. As shown in FIG. 4, which is a cross section of FIG. 3, holes are drilled through the first arm 22 and the second arm 24. Short arm 22 has a hole proximal 26 to its end, and long arm 24 has two holes: one proximal to the bridge 26 and opposite the hole 26 in the short arm 22 so that hinge pin 28 can simultaneously pass through the hole in the short arm 22 and the hole proximal to the bridge in the long arm 24. The second hole, not shown in FIG. 3, but obvious from FIG. 4 in long arm 24 is proximal to the end of the long arm farthest from the bridge.

Figure 5:
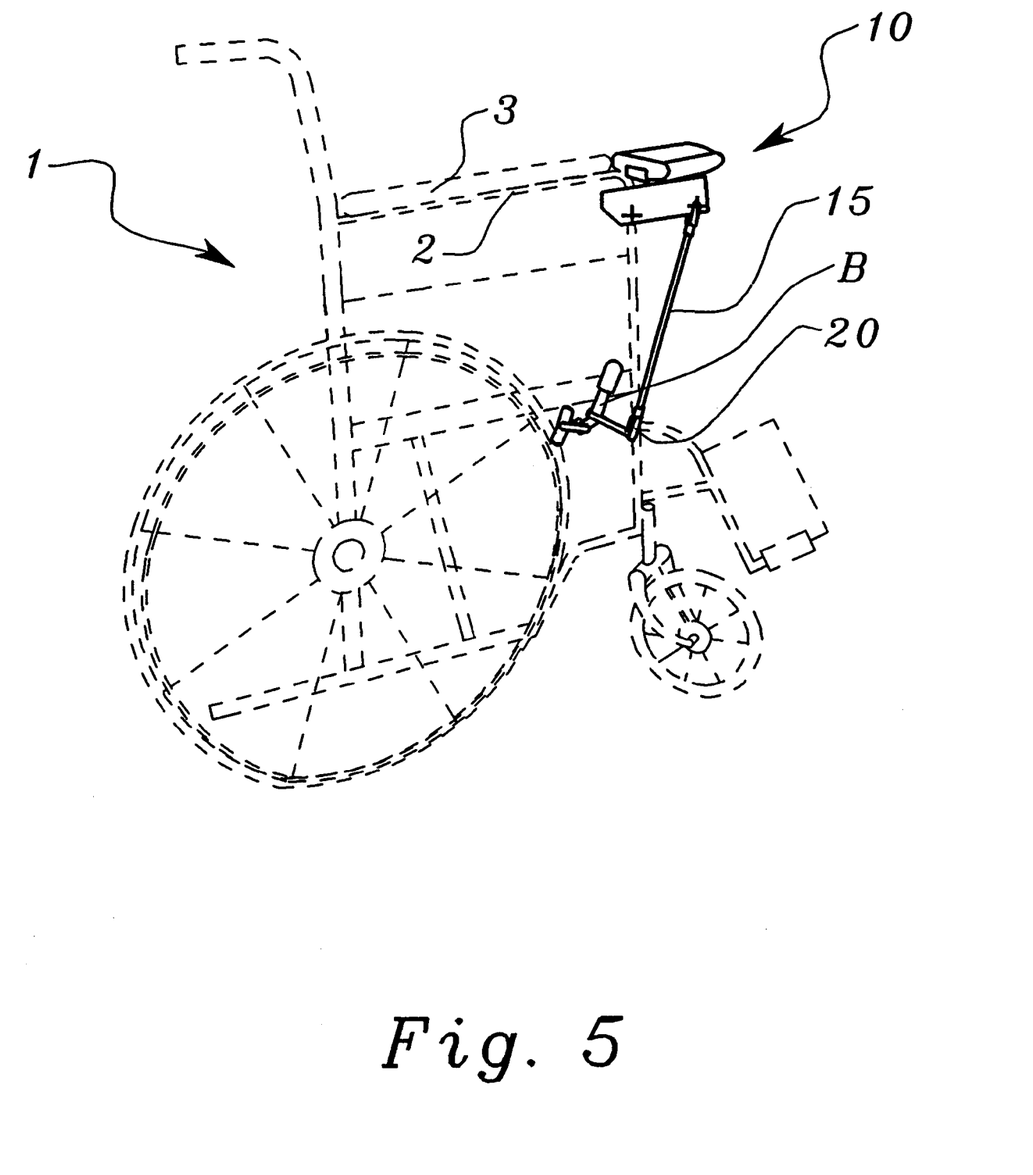
FIG. 5 is a plan view of the embodiment of the invention depicted in FIG. 1 with the brake in the actuated position.

Referring now to FIG. 5, operator means 20 is attached in pivotal relationship within the furcations 175, 176 of lower clamp 17a and clamp 17a is threadedly attached to actuator rod 15. Positioned within the hook portion of operator means 20 and fixedly secured therein by securing means which passes through the mated holes in the short arm 22 and the long arm 24, not shown, is the brake actuation lever B.

Figure 6:
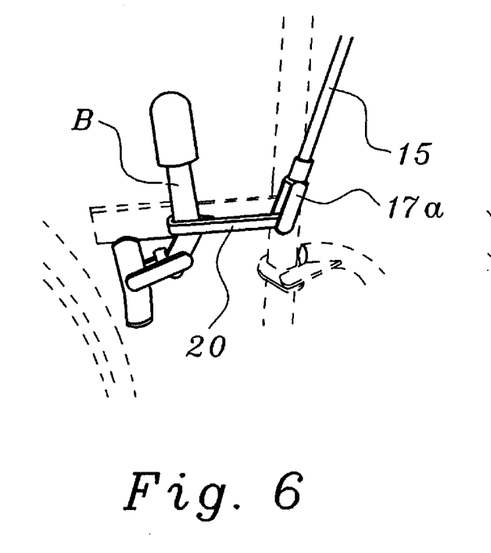
FIG. 6 is a perspective view of the actuator rod, operating means and brake activation lever.
Figure 7:
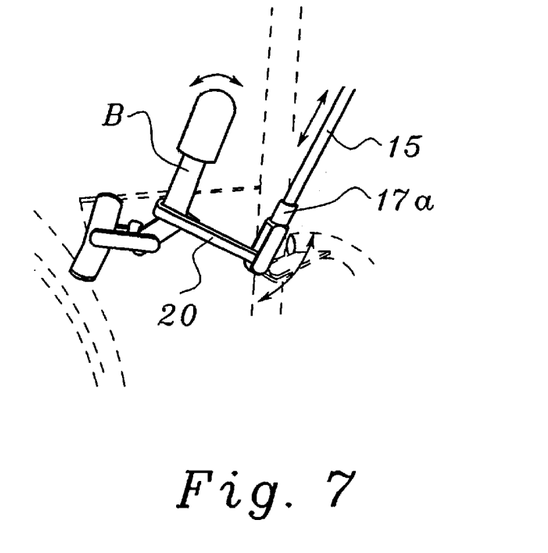
FIG. 7 is a perspective view of the actuator rod, operating means and brake activation lever showing the linear and arcuate motion of the components in response to depression of the actuator lever.

As shown by comparing FIG. 1, in which the wheel chair brake is released with FIG. 5 in which the wheel chair brake is engaged, the operation of the invention becomes clear. In the brake released position, actuator lever 10 is maintained in an upwardly angled position relative to wheel chair arm 2. In this position brake lever B is in an essentially vertical position relative to the floor or ground under the wheel chair. When the user attempts to rise from the wheel chair, it is a natural motion for the user to place his or her hands on the forward end of the arm of the wheel chair. With the actuator lever 10 positioned so that it protrudes beyond the end of the wheelchair arm as shown in FIG. 1, the natural tendency is for the user to place his or her hands on the lever to push himself or herself into a standing position. This downward force occasioned by the efforts of the user to rise causes the pivotally mounted actuator lever to move in a downward arc from the first upwardly angled position to a second, essentially horizontal position. The downward force of the moving actuator lever 10 is translated into a downward force along the long axis of actuator rod 15. In turn, the downward force along actuator rod 15 is translated into an essentially forward motion of operator means 20 thereby moving brake actuator lever B from its initial vertical position towards a forward and horizontal position causing movement of the brake shoe into frictional contact with the large drive wheel on the wheel chair. FIGS. 6 and 7 respectively illustrate the reciprocal motion of actuator rod 15 and the arcuate motion of actuator 20 which cause an arcuate motion of brake actuator lever B as the brake is engaged and disengaged. Prior to placing the wheelchair with the semi automatic braking means described herein into service, the effective length of actuator rod 15 is adjusted by screwing more or less of actuator rod 15 into clamps 17 and 17a so that when the actuator lever is fully depressed, the possibility of over rotation of the brake actuator lever is eliminated.

Figure 8:
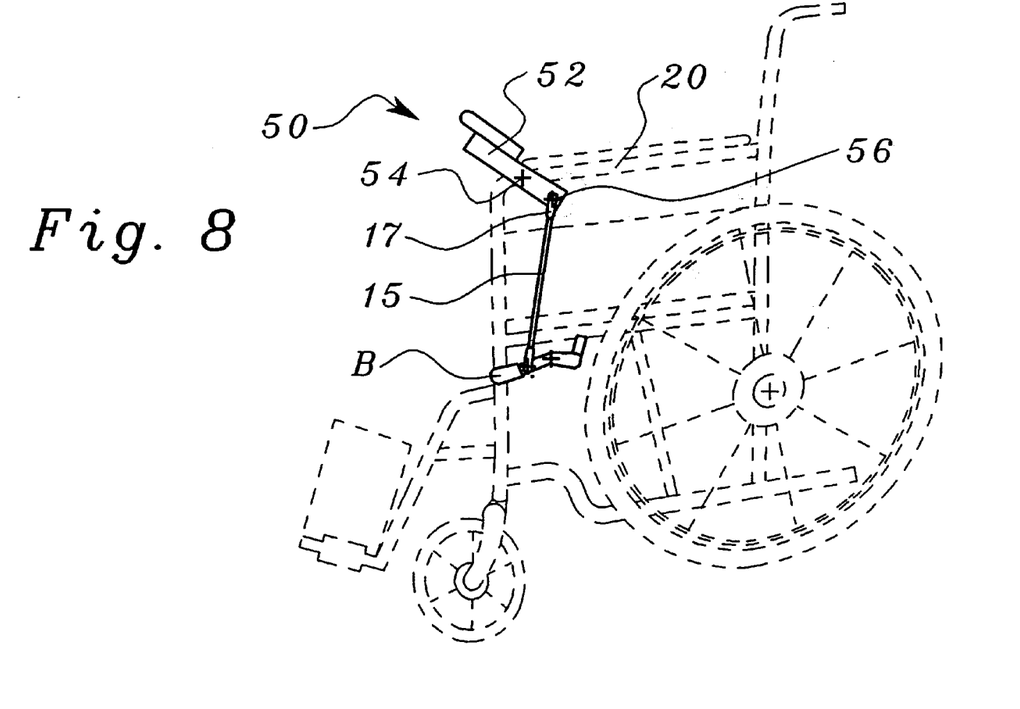
FIG. 8 is a plan view of a first alternative embodiment of the instant invention.

Referring now to FIG. 8, a first alternative embodiment of the invention is shown. In a small number of styles of wheel chairs, the wheel chair brake is actuated by moving brake activator lever B from an essentially horizontal position to an essentially vertical position. In actuality, this arrangement is less than desirable than that showed in the first embodiment described above because if excessive upward force is applied to the brake handle B, it is possible over rotate brake handle B and move the handle into past the vertical axis, thereby disengaging the brake.

In this first alternative embodiment, brake actuator lever 50 has an essentially rectangular face 52 with a front edge and a back edge. A pivot hole 54, drilled approximately in the center of said face, and an actuator rod pivot hole 56 near the back edge of said face.

Using clamping means attached to the arm 2 of the wheel chair, brake actuator lever 50 is pivotally attached to said clamp using a pivot pin of suitable design. Clamp 17 is attached to the actuator rod pivot hole 56 by means of a pivot pin which is guided through holes, not shown in the furcations 175, 176 in the forked end of the clamp. Threadingly engaged with the clamp 17 is upper end of the brake actuator rod 15. The lower end of brake actuator rod 15 is threadingly engaged to clamp 17a of the same general type as clamp 17. Brake actuator lever B is positioned between the furcations of clamp 17a and is pivotally attached to brake actuator lever B by a pivot pin 58 which passes through the furcations and through a hole provided in the brake actuator lever B as aforesaid.

Figure 9:
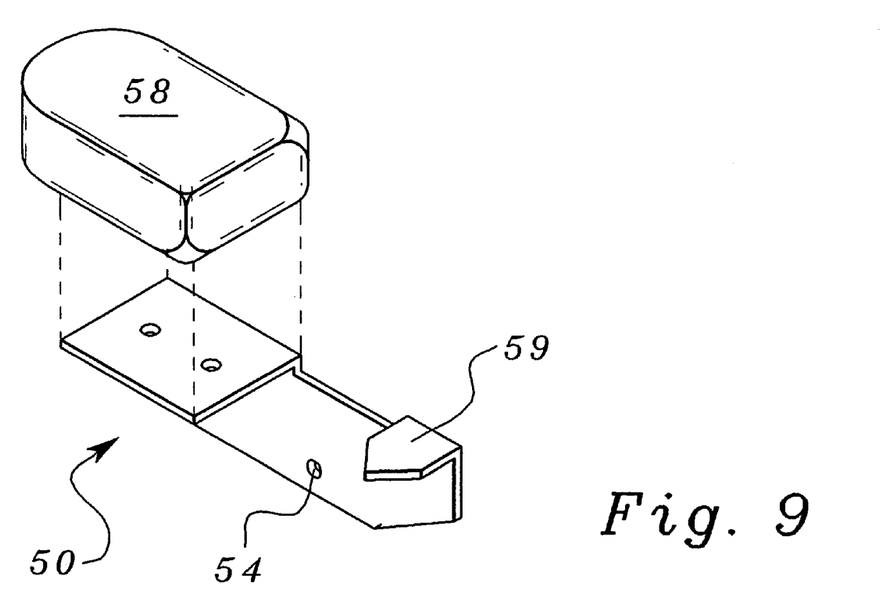
FIG. 9 is a perspective view, partially exploded, of the actuator lever for the first alternative embodiment of the invention.

Turning now to FIG. 9, a perspective view of brake actuator lever 50, with the soft protective pad 58 removed, an important feature of this embodiment is disclosed. Because of the possibility of over rotating the brake actuator lever B as described above, brake actuator 50 has arresting tab 59 protruding in an essentially perpendicular relationship to rectangular face 52 and, since it is intended that the brake actuator lever 50 be mounted on the outside of arm 2, relative to the seat so that arresting tab 59 points towards the inside or chair portion of the wheel chair. The pivotal motion of brake actuator lever 50 in a downward motion at its front edge causes arresting tab 59 to rotate upward until it comes in contact with wheel chair arm 2 thereby prohibiting further motion of the actuator lever and preventing brake actuator lever B from over rotating.

Figure 10:
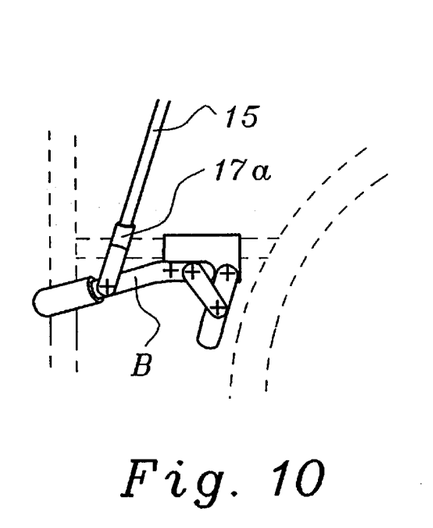
FIG. 10 is a perspective view of the actuator rod, lower clamp and brake actuation lever in the alternative embodiment of the invention.
Figure 11:
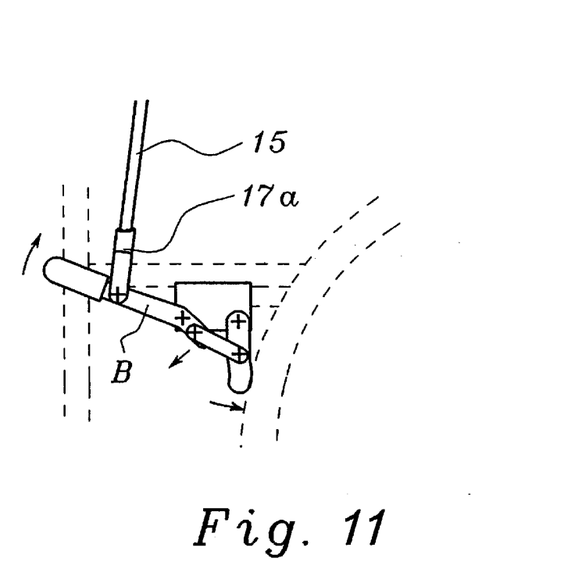
FIG. 11 depicts the relative linear and arcuate motion of the actuator rod, lower clamp and brake actuation system responsive to depression of the actuator lever.

Turning now to FIG. 10, the connection of clamp 17a is depicted. Comparison of FIG. 10 with FIG. 11 illustrates the relative motion of the actuator rod 15 and clamp 17a with the brake actuator lever B to show how the brake shoe is brought into contact with the drive wheel.

Figure 12:
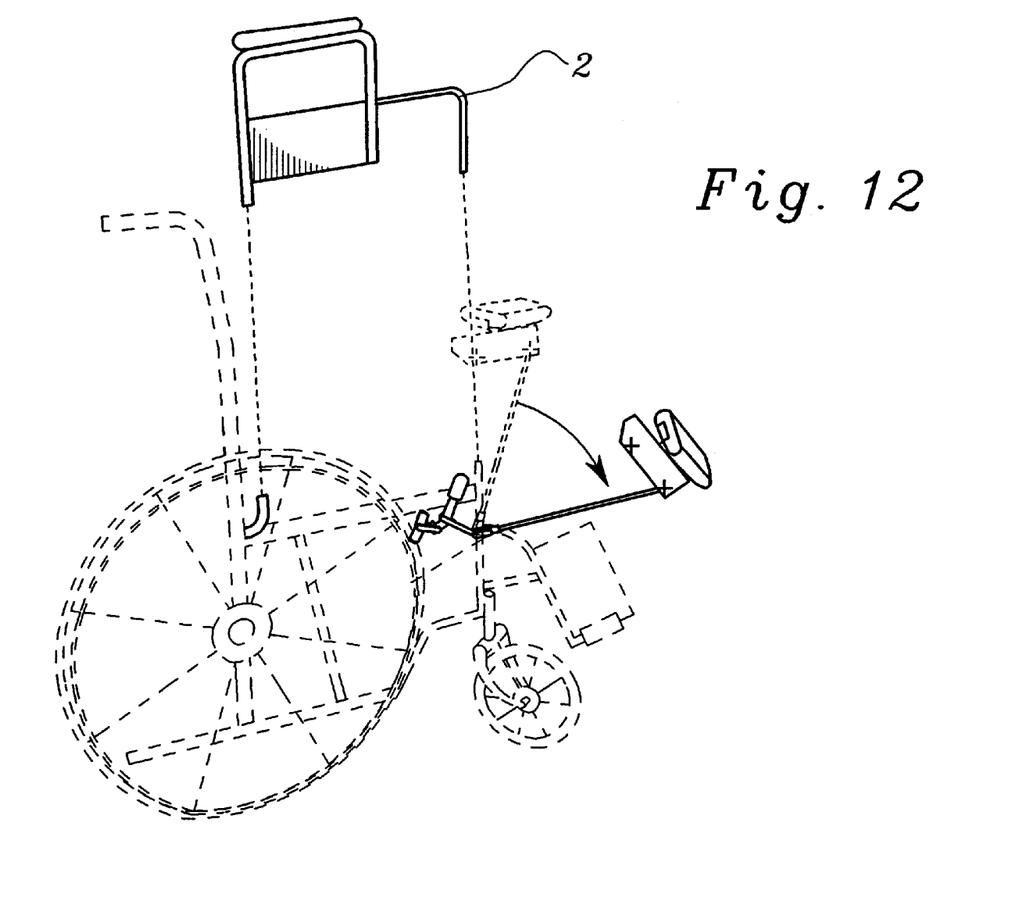
FIG. 12 is a plan view of a second alternative embodiment of the invention.

FIG. 12 depicts a second alternative embodiment of the invention. In FIG. 12, a model of wheel chair commonly described as a"desk" or"table" chair is shown. In a desk or table chair, the arms 2 are removable from the frame of the chair, thereby allowing the occupant to move the chair into a knee hole of a desk or under a counter or table top allowing the occupant to sits squarely and straight in the seat, as opposed to having to slide forward towards the front end of the seat or having to lean forward to reach the desk top or table top. In this alternative embodiment, a removable pin 28a is substituted for the pivot pin which is inserted into pivot hole 28.

Figure 13:
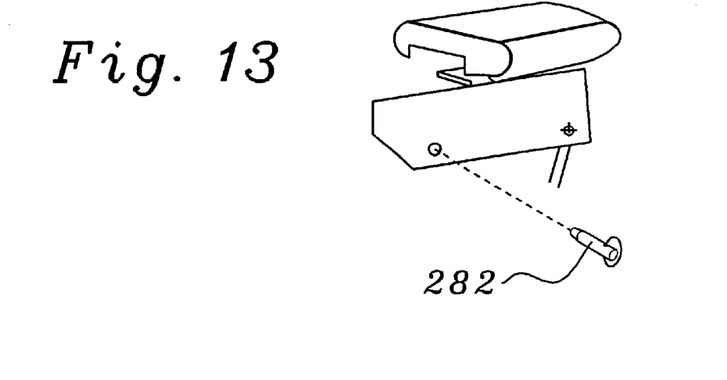
FIG. 13 is a perspective view of an actuator lever for the second alternative embodiment of the invention, partially exploded.

The structure of removable pin 28a is well known in the art and comprises an essentially hollow pin which has within it several ball bearings which protrude from the conically shaped surface of the pin. The ball bearings are spring loaded and biased outwardly from the surface of the pin. When the pin is inserted into the pivot hole and clamp, the ball bearings retract into the body of the pin allowing the pin to pass through the metal boundaries of the various channels. The bearings then extend when the metal of the actuator lever and clamp have been cleared, thereby retaining the pin removably in place. It is understood that there are several types of securable pins commonly available, and this description is not intended to limit the invention to the ball-bearing type of pin described here. Thus, when the occupant of a desk or table chair wishes to remove the arms so as to move into the knee hole of a desk or under a table top, all he or she must do is pull the pivot pins 28a from the actuator lever, as shown in FIG. 13. The actuator assembly will fall forward, as shown in FIG. 12, then the arms 2 are free to be removed in the usual manner. The process would then be reversed to reinstall the arms and the brake actuator mechanism. Of course, it is understood that pin 28a could be used in any of the embodiments shown herein, but that it only has utility when employed with a desk or table type wheel chair.

Additional advantages and modifications will readily occur to those skilled in the art. Therefore, the invention in its broader aspects is not limited to the specific details, and representative devices and methodologies shown are described herein. Accordingly, various modifications may be made without departing from the spirit or scope of the general inventive concept as defined by the appended claims and their equivalents.

What is claimed is:

1. A semi automatic brake actuator a wheel chair having at least one arm with a forward end and a braking system with a lever for actuating said braking system comprising    a. clamping means adapted to be fixedly attached to said arm;

b. an actuator lever having at least two pivot points pivotally attached to said clamping means at one of said pivot points so that said actuator lever beyond the forward end of said arm;

c. a first pivot clamping means having a forked end comprising spaced apart furcations and a pivot pin mountable between said furcations pivotally and rotationally attached to said actuator lever by placing the second of said two pivot points of said actuator lever between said furcations and securing said first pivot clamping means and said actuator lever by means of said pivot pin;

d. an actuator rod having a first, threaded upper end and a second, threaded lower end, said first upper end threadedly engaged in said first pivot clamping means, said second lower end threadedly engaged in a second pivot clamping means; and    e. operator means having means having a first end and a second end pivotally engaged with said actuator rod at said first end by means of said second pivot clamp, and fixedly attached at said second end to said lever for actuating said braking system.

2. The semi automatic brake actuator for a wheel chair having at least one arm with a forward end and a braking system of claim 1 wherein said actuator lever is reciprocally rotatable from a first postition, upwardly angled relative to the arm to a second position relatively and substantially parallel to said arm.

3. A semi automatic brake actuator for a wheel chair having at least one arm with a forward end and a braking system having a lever for actuating said braking means of claim 1, wherein said actuator rod is threadedly adjustable in length.

4. A semi automatic brake actuator for a wheel chair having at least one arm with a forward end and a braking system having a lever for actuating said braking means of claim 3, wherein said actuator rod is reciprocally movable from a first, upper position to a second, lower position.

5. A semi automatic brake actuator for a wheel chair having at least one arm with a forward end and a braking system having a lever for actuating said braking system of claim 1 wherein said operator means moves rotationally in response to said linear motion of said actuator rod thereby reciprocally moving said lever for actuating said braking system from a first, brake-released, position to a second, brake-applied, position.

6. A semi-automatic brake actuator for a wheel chair having at least one arm with a forward end and a braking system having a lever for actuating a wheel chair braking means of claim 1 wherein said actuator lever cooperates with said actuator rod and said operator means to move the lever for actuating the wheelchair braking means from a first or normal, brake-released position to a second brake-applied position.

7. A semi-automatic brake actuator for a wheel chair having at least one arm with a forward end and a braking system having a lever for actuating a wheel chair braking means of claim 1 wherein said actuator lever is fixedly attached to said clamping means so as to protrude beyond said forward end of said arm.

8. A semi-automatic brake actuator for a wheel chair having at least one arm with a forward end and a braking system having a lever for actuating a wheel chair braking means of claim 1 wherein said actuator lever is removably attached to said clamping means.

9. A semi automatic brake actuator for a wheel chair having at least one arm with a forward end and a braking system having a lever for actuating a wheel chair braking means comprising an actuator lever adapted to be pivotally mounted to an arm of a wheel chair by clamping means so that said actuator lever protrudes beyond said forward end of said arm and being moveable from a first, essentially vertical position relative to said arm to a second, substantially horizontal position relative to said arm; an actuator rod having a first, upper end and a second lower end, said first upper end being pivotally attached to said actuator lever and said second lower end being pivotally attached to an operator means, said rod being reciprocally moveable responsive to said reciprocal motion of said actuator lever from a first upper position to a second lower position; and operator means having a first end and a second end pivotally mounted at said first end to the lower end of said actuator rod and attachedly engaging said brake actuator lever at said second end and being rotationally moveable from a first position to a second position responsive to said linear motion of said actuator rod, said actuator rod cooperating with said actuator lever and said operator means to move said brake actuator lever from a brake released position to a brake applied position.

10. A semi automatic brake actuator for a wheel chair having at least one arm with a forward end and a braking system having a lever for actuating a wheel chair braking means of claim 9 wherein said actuator rod is a long, rigid connecting structure having a first threaded end and a second threaded end, said first and second ends being threadedly connected to pivot clamps, said pivot clamp attached to said first end being pivotally connected by means of said clamp to said actuator lever, said second end being pivotally connected by means of said clamp to said operator means.

11. A semi automatic brake actuator for a wheel chair having at least one arm with a forward end and a braking system with a lever for actuating said system comprising an actuator lever adapted to be clampingly attached to said arm by clamping means so that the forward end of said lever for actuating said system protrudes beyond said forward end of said arm and being capable of pivotal motion relative to said arm, an actuator rod having a first, upper end and a second lower end, said upper end being pivotally connected to said actuator lever and constrained to reciprocal linear motion in response to said pivotal motion of said actuator lever, an actuator means having a first end and a second end, said actuator means being pivotally connected to said lower end of said actuator rod at said first end and fixedly connected to said lever for actuating said braking means at said second end and being rotatably moveable responsive to said linear motion of said actuator rod thereby causing said lever for actuating said braking means to reciprocally move from a first, brake-off position to a second, brake -on position.

12. A semi automatic brake actuator for a wheel chair having at least one arm with a forward end and a braking system with a lever for actuating said system of claim 11 wherein said actuator lever is fixedly clamped to said arm so that said lever protrudes beyond said forward end of said arm.

13. A semi automatic brake actuator for a wheel chair having at least one arm and a braking system with a lever for actuating said system of claim 11 wherein said actuator lever is removably clamped to said arm.

* * * * *